US012072661B2

(12) United States Patent
Hongu et al.

(10) Patent No.: US 12,072,661 B2
(45) Date of Patent: Aug. 27, 2024

(54) IMAGE FORMING APPARATUS

(71) Applicant: CANON KABUSHIKI KAISHA, Tokyo (JP)

(72) Inventors: Shigeo Hongu, Ibaraki (JP); Junichiro Nakabayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/330,038

(22) Filed: Jun. 6, 2023

(65) Prior Publication Data

US 2023/0400807 A1 Dec. 14, 2023

(30) Foreign Application Priority Data

Jun. 13, 2022 (JP) ................................ 2022-094790

(51) Int. Cl.
*G03G 15/00* (2006.01)
*G03G 15/095* (2006.01)

(52) U.S. Cl.
CPC .......... *G03G 15/80* (2013.01); *G03G 15/095* (2013.01)

(58) Field of Classification Search
USPC .................................................. 399/88, 352
See application file for complete search history.

(56) References Cited

U.S. PATENT DOCUMENTS 9,235,186 B2 1/2016 Hatazaki

FOREIGN PATENT DOCUMENTS

JP 2003162172 A * 6/2003
JP 2015148713 A 8/2015
JP 6570369 B2 * 9/2019

* cited by examiner

*Primary Examiner* — Quana Grainger
(74) *Attorney, Agent, or Firm* — ROSSI, KIMMS & McDOWELL LLP

(57) ABSTRACT

An image forming apparatus includes an image forming unit, a first rotary member, a second rotary member, a web, a feed roller, a winding roller, a contact member, a detection unit, and a control unit. In a state where the apparatus is turned from a first power-ON state to a second power-ON state through a power-OFF state after the contact member reached a notch, if a difference between a diameter of a web at an end of the first power-ON state and the diameter of the web at a start of the second power-ON state is equal to or greater than a predetermined value, the control unit controls the image forming unit not to form a toner image. In the state after the contact member reached the notch, if the difference is smaller than the predetermined value, the control unit permits the image forming unit to form a toner image.

8 Claims, 10 Drawing Sheets

FIG.7A

| RESIDUAL QUANTITY | PRESENT | NEAR-END | END |
|---|---|---|---|
| FLAG SENSOR | OFF | ON | ON |
| (NO WEB DIAMETER DETECTION UNIT) | — | — | — |
| NEAR-END COUNTER | — | 0 | 50000 |

FIG.7B

| RESIDUAL QUANTITY | PRESENT | NEAR-END | END |
|---|---|---|---|
| FLAG SENSOR | OFF | ON | ON |
| WEB DIAMETER DETECTION UNIT | SMALL | MEDIUM | LARGE |
| NEAR-END COUNTER | — | 0 | 50000 |

IMAGE FORMING APPARATUS

BACKGROUND OF THE INVENTION

Field of the Invention

The present invention relates to image forming apparatuses that adopt an electrophotographic technique, such as a printer, a copying machine, a facsimile, or a multifunction device.

Description of the Related Art

In image forming apparatuses, toner images are fixed to recording materials by heating and pressing the toner images formed on the recording materials in a fixing unit, but toner may be attached to a fixing roller or pressing roller in the fixing unit during fixing of the toner image. For example, if toner is attached to the fixing roller, the recording material may be soiled with toner. Therefore, toner attached to the fixing roller is removed by a cleaning device equipped with a cleaning web, hereinafter simply referred to as web, formed of nonwoven fabric. In such a cleaning device, the web is consumed while being wound up gradually. Hitherto, a notched portion was formed on the web, and in accordance with a flag member arranged in contact with the web passing the notched portion and being displaced thereby, it was detected that a residual quantity of the web has reached a predetermined residual quantity using a photosensor (Japanese Patent Application Laid-Open Publication No. 2015-148713).

In image forming apparatuses, maintenance personnels such as a service engineer may turn the power of the image forming apparatus off to perform maintenance operations of the cleaning device. In that case, the maintenance personnel may rewind the web such that the residual quantity of the web is reduced. Hitherto, even if the residual quantity of the web was reduced after the residual quantity of the web has reached a predetermined residual quantity, it was difficult to detect the residual quantity of the web after it had been reduced. Therefore, if an image forming job was executed after the web that has reached the predetermined residual quantity had been rewound, there was a risk that the web was used up and the web was torn or image defects were caused. Therefore, after the residual quantity of the web had reached a predetermined residual quantity, it was determined that the image forming job could not be executed unless the web had been exchanged.

Therefore, if the image forming apparatus was turned on again after it had been turned off once after the web had reached the predetermined residual quantity, execution of the image forming job was not permitted even if the web had residual quantity. This is because the residual quantity of the web may have changed during the turning off and turning on of power, and there is no guarantee that the residual quantity of the web after the power has been turned on again is the actual residual quantity of the web allowing image formation to be performed.

The present invention provides an image forming apparatus capable of executing an image forming job in a state where the web has residual quantity, even when the image forming apparatus had been turned off and on after the web has reached a predetermined residual quantity.

SUMMARY OF THE INVENTION

According to a first aspect of the present invention, an image forming apparatus includes an image forming unit configured to form a toner image on a recording material, a first rotary member, a second rotary member configured to form a nip portion together with the first rotary member and fix a toner image to a recording material, a web configured to collect toner from a surface of the first rotary member and including a notch formed at a first end portion of the web in a width direction of the web, a feed roller around which the web is wound and configured to feed the web to collect toner from the surface of the first rotary member, a winding roller configured to wind the web used to collect toner from the surface of the first rotary member, a first contact member configured to be in contact with the first end portion of the web, a detection unit configured to detect an outer diameter of the web wound around the winding roller or the feed roller, and a control unit. In a state where the image forming apparatus is turned from a first power-ON state to a second power-ON state through a power-OFF state after the first contact member has reached the notch, if a difference between the outer diameter of the web detected by the detection unit at an end of the first power-ON state and the outer diameter of the web detected by the detection unit at a start of the second power-ON state is equal to or greater than a predetermined value, the control unit is configured to control the image forming unit not to form a toner image on a recording material. In the state where the image forming apparatus is turned from the first power-ON state to the second power-ON state through the power-OFF state after the first contact member has reached the notch, if the difference between the outer diameter of the web detected by the detection unit at the end of the first power-ON state and the outer diameter of the web detected by the detection unit at the start of the second power-ON state is smaller than the predetermined value, the control unit is configured to permit the image forming unit to form a toner image on a recording material.

According to a second aspect of the present invention, an image forming apparatus includes an image forming unit configured to form a toner image on a recording material, a first rotary member, a second rotary member configured to form a nip portion together with the first rotary member and fix a toner image to a recording material, a web configured to collect toner from a surface of the first rotary member, a feed roller around which the web is wound and configured to feed the web to collect toner from the surface of the first rotary member, a winding roller configured to wind the web used to collect toner from the surface of the first rotary member, a detection unit configured to detect an outer diameter of the web wound around the winding roller or the feed roller, the detection unit being configured to detect an amount of use of the web, and a control unit configured to output an information related to replacement of the web in a state where a predetermined amount of the web has been used. In a state where the image forming apparatus is turned from a first power-ON state to a second power-ON state through a power-OFF state after the predetermined amount of the web has been used, if a difference between an outer diameter of a web detected by the detection unit at an end of the first power-ON state and an outer diameter of a web detected by the detection unit at a start of the second power-ON state is equal to or greater than a predetermined value, the control unit is configured to control the image forming unit not to form a toner image on a recording material. In a state where the image forming apparatus is turned from the first power-ON state to the second power-ON state through the power-OFF state after the predetermined amount of the web has been used, if the difference between then outer diameter of the web detected by the detection unit at the end of the first power-ON state and then outer diameter of the web detected by the detection unit at the start of the second power-ON state is smaller than the predetermined value, the control unit is configured to permit the image forming unit to form a toner image on a recording material.

Further features of the present invention will become apparent from the following description of exemplary embodiments with reference to the attached drawings.

BRIEF DESCRIPTION OF THE DRAWINGS

FIG. 7A is an explanatory view illustrating a method for detecting a web residual quantity according to a comparative example.

FIG. 7B is an explanatory view illustrating a method for detecting a web residual quantity according to the present embodiment.

DESCRIPTION OF THE EMBODIMENTS

Image Forming Apparatus

Figure 1:
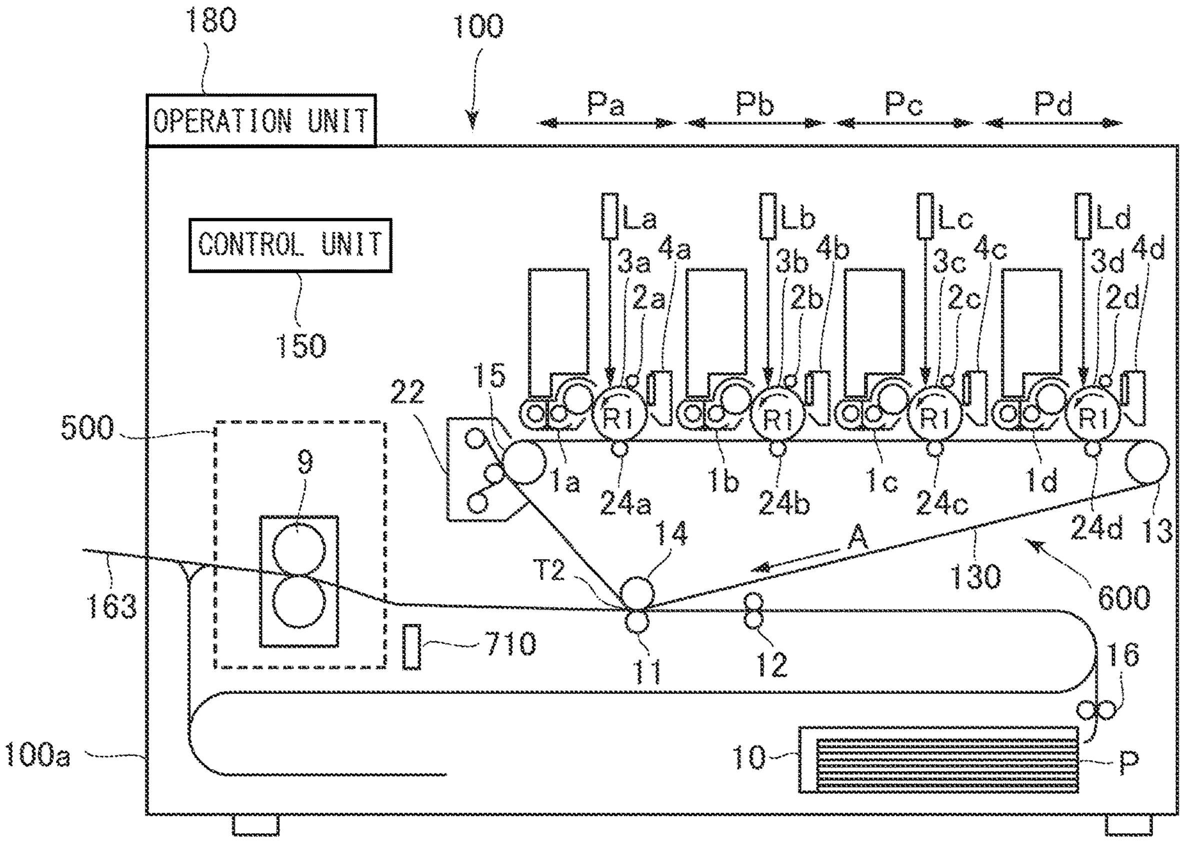
FIG. 1 is a schematic drawing illustrating a configuration of an image forming apparatus according to a present embodiment.

One embodiment of the present technique will be described hereafter. An image forming apparatus 100 illustrated in FIG. 1 is a tandem intermediate transfer-type full color printer having image forming units Pa, Pb, Pc, and Pd of yellow, magenta, cyan, and black arranged along an intermediate transfer belt 130 which is moved in rotation.

In the image forming unit Pa, a yellow toner image is formed on a photosensitive drum 3*a* and transferred to the intermediate transfer belt 130. In the image forming unit Pb, a magenta toner image is formed on a photosensitive drum 3*b* and transferred to the intermediate transfer belt 130. In the image forming units Pc and Pd, a cyan toner image and a black toner image are each formed on photosensitive drums 3*c* and 3*d* and transferred to the intermediate transfer belt 130. The toner images of four colors transferred to the intermediate transfer belt 130 are conveyed to a secondary transfer portion T2 and secondarily transferred to a recording material P. Various types of sheet materials can be used as the recording material P, including paper such as normal paper, thick paper, rough paper, uneven paper, and coated paper, plastic films, and cloth.

A separation roller 16 separates the recording materials P drawn out from a cassette 10 sheet by sheet and conveys the same to a registration roller 12. The registration roller 12 sends the recording material P to the secondary transfer portion T2 at a matched timing with the toner image on the intermediate transfer belt 130. The recording material P to which a four-color toner image has been secondarily transferred is heated and pressed at the fixing unit 9, by which the toner image is fixed to a surface of the recording material P.

In the case of one-side printing, the recording material P to which a toner image has been fixed by the fixing unit 9 is discharged as it is onto a sheet discharge tray 163. In the case of duplex printing, the recording material P having a toner image fixed to a surface thereof is conveyed to a reverse conveyance path where front and rear sides thereof are reversed before the recording material P is supplied again to the registration roller 12. Then, a toner image is transferred to a rear surface of the recording material P at the secondary transfer portion T2, and the toner image is fixed to the rear surface by the fixing unit 9 before the recording material P is discharged onto the sheet discharge tray 163.

Image Forming Unit

Image forming units Pa, Pb, Pc, and Pd adopt approximately the same configuration except for the different toner colors used in developing apparatuses 1*a*, 1*b*, 1*c*, and 1*d*, which are yellow, magenta, cyan, and black. Therefore, the image forming unit Pa using yellow toner is described below as a representative example, and descriptions of other image forming units Pb, Pc, and Pd are omitted.

The image forming unit Pa includes a charging unit 2*a*, an exposing unit La, a developing apparatus 1*a*, a primary transfer roller 24*a*, and a drum cleaning device 4*a*, which are disposed around the photosensitive drum 3*a*. The photosensitive drum 3*a* is, for example, an electrophotographic photosensitive member having a photosensitive layer formed on an outer circumference surface of an aluminum cylinder, which is rotated in the direction of arrow R1 at a predetermined processing speed. The charging unit 2*a* uniformly charges the surface of the photosensitive drum 3*a* to predetermined potential according to application of charging voltage from a power supply not shown. The exposing unit La scans a laser beam having subjected scanning line image signals obtained by expanding images of respective colors to on/off modulation using a rotary mirror not shown, and forms an electrostatic latent image on the photosensitive drum 3*a*. The developing apparatus 1*a* uses developer to develop the electrostatic latent image formed on the photosensitive drum 3*a* into a toner image.

The primary transfer roller 24*a* presses the intermediate transfer belt 130 and forms a primary transfer portion between the photosensitive drum 3*a* and the intermediate transfer belt 130. By having a primary transfer voltage applied to the primary transfer roller 24*a* from a power supply not shown, a toner image on the photosensitive drum 3*a* is primarily transferred to the intermediate transfer belt 130. The intermediate transfer belt 130 is stretched across and supported by a tension roller 15, a secondary transfer inner roller 14, and a driving roller 13, and driven to rotate in an arrow A direction by the driving roller 13. A secondary transfer outer roller 11 abuts against the intermediate transfer belt 130 supported by the secondary transfer inner roller

14 and forms the secondary transfer portion T2. By having a secondary transfer voltage applied from a power supply not shown to the secondary transfer outer roller 11, a toner image on the intermediate transfer belt 130 is secondarily transferred to the recording material P passing through the secondary transfer portion T2. In the case of the present embodiment, the image forming units Pa to Pd, the intermediate transfer belt 130, the primary transfer rollers 24*a* to 24*d*, the driving roller 13, the tension roller 15, the secondary transfer inner roller 14, and the secondary transfer outer roller 11 constitute an image forming unit 600 capable of forming a toner image on the recording material P.

The drum cleaning device 4*a* rubs a cleaning blade against the photosensitive drum 3*a* to collect transfer residual toner remaining on the photosensitive drum 3*a* after primary transfer. A belt cleaning device 22 collects transfer residual toner remaining on the intermediate transfer belt 130 after secondary transfer.

A door 500 capable of being opened and closed is provided on an apparatus body 100*a*. In a state where the door 500 is opened, maintenance personnels can access the fixing unit 9 inside the apparatus body 100*a* from the exterior and perform maintenance operations of the fixing unit 9 or replacement operations of a cleaning web described later. Further, an opening/closing sensor 710 that detects the opening and closing of the door 500 is provided.

Fixing Unit

Next, a configuration of the fixing unit 9 according to the present embodiment will be described with reference to FIG. 2. The fixing unit 9 includes a fixing roller 201 for heating the toner image on the recording material P, a pressure roller 202 for pressing the recording material P, and a cleaning unit 210 for cleaning the fixing roller 201. The fixing roller 201 serving as a first rotary member is driven to rotate by a motor not shown.

The fixing roller 201 and the pressure roller 202 include, for example, a core bar formed in a cylindrical shape using aluminum or iron, an elastic layer made of silicone rubber and formed on an outer circumference surface of the core bar, and a release layer that covers an outer circumference surface of the elastic layer. The release layer is formed of a fluororesin tube made, for example, of tetrafluoroethylene-perfluoroalkyl vinyl ether copolymer (PFA) or polytetrafluoroethylene (PTFE).

A halogen heater 205 for heating the fixing roller 201 is disposed in an inner side of the fixing roller 201. A surface temperature of the fixing roller 201 is detected by a thermistor 206, and the detected surface temperature is entered to a control unit 150 (refer to FIG. 1). The control unit 150 adjusts the temperature of the halogen heater 205 so that the surface temperature of the fixing roller 201 is heated to a controlled temperature. In the present embodiment, the controlled temperature is set within a range of "135 to 200° C.", depending on the type of the recording material P, more specifically, grammage, so as to cope with various recording materials P.

The pressure roller 202 serving as a second rotary member is in pressure contact with the fixing roller 201 with a total pressure of approximately 784 N (approximately 80 kg), for example, by a spring not shown, and forms a fixing nip portion between the fixing roller 201. By being in pressure contact with the fixing roller 201, the pressure roller 202 is driven to rotate together with the rotating fixing roller 201 which is being rotated. The recording material P having the toner image formed thereto is nipped and conveyed by the fixing roller 201 and the pressure roller 202 being rotated, and heat and pressure is applied to the recording material P when it passed through the fixing nip portion, by which the toner image is fixed to the recording material P.

Cleaning Unit

As described above, since the fixing roller 201 is heated and has a high surface temperature, the toner on the recording material P that has been melted by heat, which is so-called offset toner, is easily attached thereto. Further, if the recording material P is jammed during the image forming operation, the unfixed toner on the recording material P may be attached to the fixing roller 201. Therefore, the cleaning unit 210 is provided to remove the toner attached to the fixing roller 201.

The cleaning unit 210 includes a web feed roller 211, a cleaning web, hereinafter simply referred to as web, 212, a collecting roller 204 that comes into contact with the fixing roller 201, a web pressing roller 213, and a web winding roller 214. The web feed roller 211 serving as a supply unit holds the web 212 that is not yet used, and is capable of being driven by the web winding roller 214 to supply the web 212 to a rubbing position K where it comes into contact with the collecting roller 204. The web 212 is made of a heat-resistant nonwoven fabric such as Nomex (Registered Trademark) or Himelon (Registered Trademark), and is formed to have a width of "330 mm", a total length of "37000 mm", and a thickness of "65 μm".

The web winding roller 214 serving as a winding portion is driven to rotate by a web drive motor 240, and winds up the web 212 that has been sent out from the web feed roller 211 and used. The web winding roller 214 winds up the web 212 so that an unused portion of the web 212 comes into contact with the collecting roller 204. The web 212 is stretched across the web winding roller 214 and the web feed roller 211, and held in a manner capable of being removed in a state wound around the web winding roller 214, i.e., rolled state.

The web pressing roller 213 serving as a pressing rotary member is disposed rotatably, and presses the web 212 supplied from the web feed roller 211 against the collecting roller 204. Thereby, the web 212 is in contact with the collecting roller 204. In other words, the web 212 is rubbed against the collecting roller 204 that comes into contact with the fixing roller 201 and driven to rotate thereby, without rubbing the fixing roller 201 directly. Thus, the toner attached to the fixing roller 201 is cleaned by the collecting roller 204 and is removed indirectly by the web 212 through the collecting roller 204.

The collecting roller 204 serving as a rotary member, i.e., intermediate rotary member, is a rod-shaped metallic member having a diameter of "20 mm", with a surface layer formed of stainless steel (SUS 304), for example. In this case, release properties of toner of the collecting roller 204 is lower than the release layer of the fixing roller 201, such that toner is easily transferred from the fixing roller 201 to the collecting roller 204 and attaches thereto. Further, by having the web 212 come into contact with the collecting roller 204, the toner attached to the collecting roller 204, or rotary member, is removed by the web 212. For example, a rotary direction length of the nip portion formed by the fixing roller 201 and the collecting roller 204 is approximately "2 mm", and the rotary direction length of the nip portion formed by the collecting roller 204 and the web 212 is approximately "8 mm".

According to the present embodiment in which the toner attached to the fixing roller 201 is removed by the web 212, when the web 212 is used up, the web 212 cannot be wound up any more, and the collecting roller 204 will be rubbed repeatedly by the same area of the web. Then, the toner attached to the fixing roller 201 will be rotated on the surface of the fixing roller 201 without being removed and may be attached to the recording material P during fixing operation, such that the recording material P may be soiled with toner. Therefore, in order for the web 212 to not be used anymore after it has been used up, the state in which the web 212 has reached a predetermined residual quantity is being detected. Hereafter, a configuration and operation of the sensor unit for detecting that the web 212 has reached a predetermined residual quantity will be described with reference to FIGS. 3A to 4B.

Sensor Unit

Figure 3A:
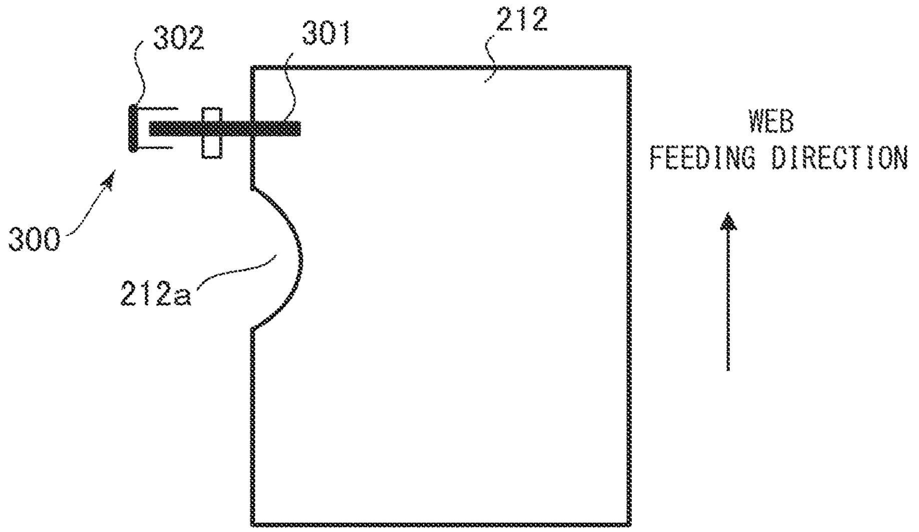
FIG. 3A is a top view illustrating a sensor unit in a state prior to passing a notched portion.

The web 212 has a notched portion 212*a* formed in a direction of movement, or winding direction, as illustrated in FIG. 3A. The notched portion 212*a* is formed at a part of an edge portion in a direction intersecting a direction of movement of the web 212. A sensor unit 300 is arranged in a movement path of the web 212 in a manner capable of detecting the notched portion 212*a* accompanying the winding of the web 212.

The sensor unit 300 includes a flag 301 serving as a first contact member, and a flag sensor 302 serving as a detection unit. The flag 301 is urged toward the web 212 by a spring not shown and is arranged in a displaceable manner in contact with the web 212. The sensor unit 300 detects by the flag sensor 302 that the above-mentioned notched portion 212*a* has passed therethrough along with the winding motion of the web 212. The flag sensor 302 serving as a detection sensor is a photosensor that has a light emitting portion and a light receiving portion, and it is connected to the control unit 150 (refer to FIG. 1) in a manner capable of sending and receiving signals to and from the control unit 150.

Figure 3B:
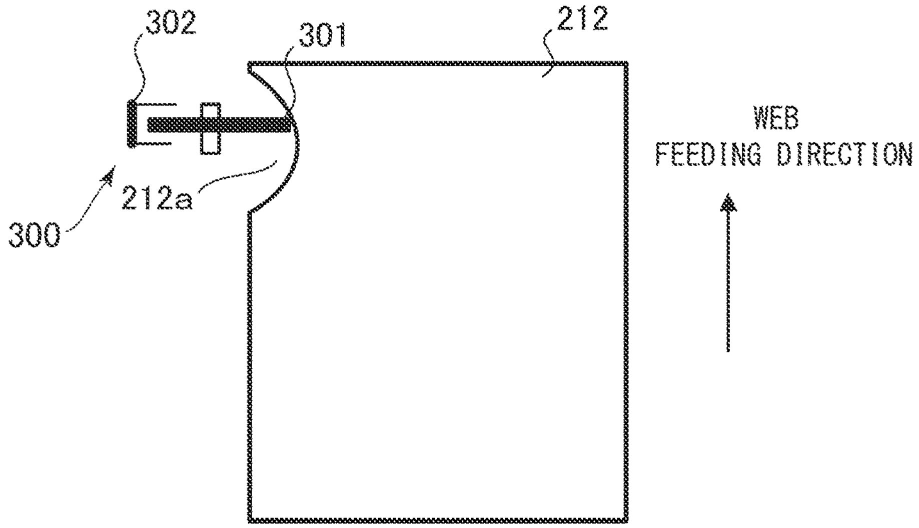
FIG. 3B is a top view illustrating the sensor unit in a state being passed through the notched portion and being displaced.
Figure 3C:
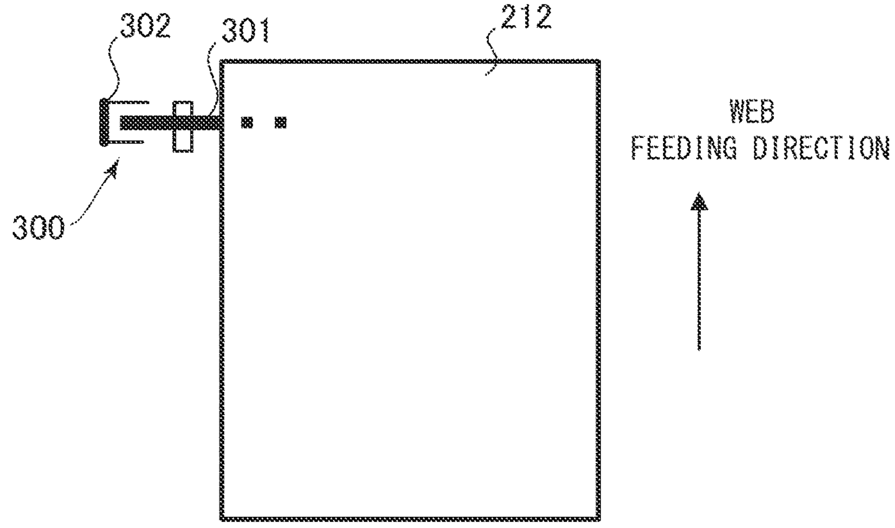
FIG. 3C is a top view illustrating the sensor unit in a state having passed through the notched portion.
Figure 4A:
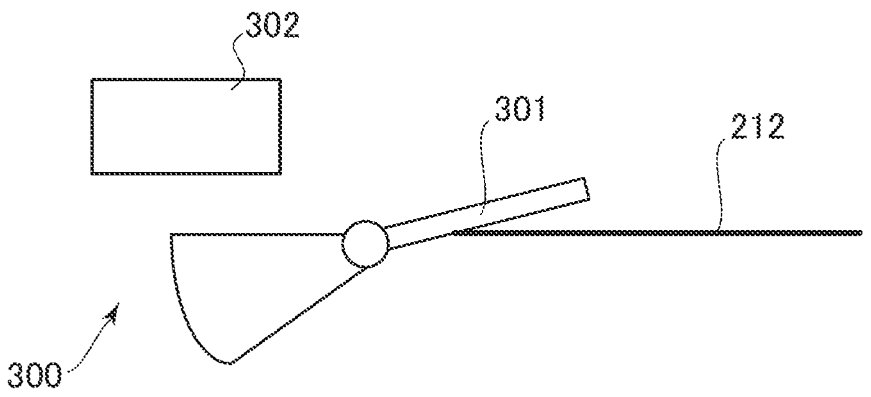
FIG. 4A is a side view illustrating an operation of the sensor unit in a state prior to detection.
Figure 4B:
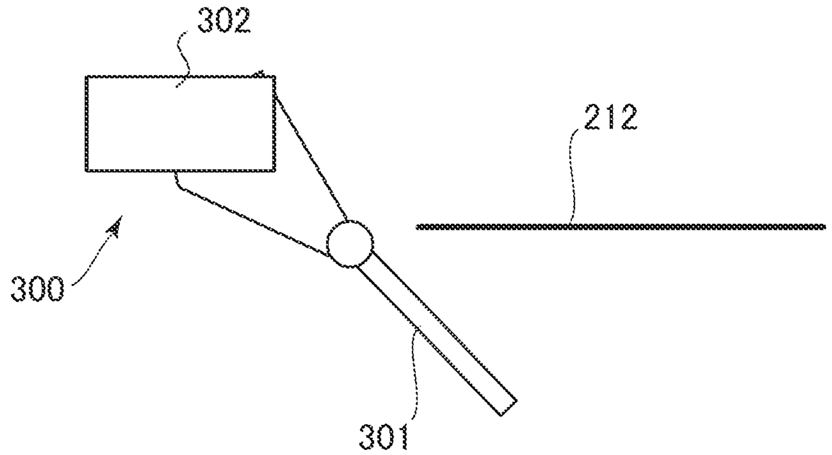
FIG. 4B is a side view illustrating an operation of the sensor unit in a state after detection.

In a state where the flag 301 is in a state of contact with the web 212, as illustrated in FIG. 3A, the space between the light emitting portion and the light receiving portion is not blocked by the flag 301, and the flag sensor 302 is in a light transmitting state (OFF) in which the light emitted from the light emitting portion is received by the light receiving portion, as illustrated in FIG. 4A. Meanwhile, in a state where the state of contact of the flag 301 is released, as illustrated in FIGS. 3B and 3C, the space between the light emitting portion and the light receiving portion is blocked by the flag 301, and the flag sensor 302 is transferred to a light shielding state (ON) in which the light emitted from the light emitting portion is not received by the light receiving portion, as illustrated in FIG. 4B.

The state of contact of the flag 301 will not be released from the starting edge of the web 212 to the notched portion 212*a*, and the flag sensor 302 is maintained in the light transmitting state. Meanwhile, in a state where the notched portion 212*a* of the web 212 reaches the flag 301, the state of contact of the flag 301 is released, and the flag sensor 302 is transferred from the light transmitting state to the light shielding state. Thereafter, as illustrated in FIG. 3C, the flag 301 stays displaced and will not return to the position before displacement, and the flag sensor 302 will be maintained in the light transmitting state illustrated in FIG. 4B.

As described, the flag sensor 302 is transferred from the light transmitting state to the light shielding state by the flag 301 reaching the notched portion 212*a*, by which the sensor unit 300 can detect the notched portion 212*a* of the web 212. The notched portion 212*a* is formed at a position corresponding to "95%" of the overall length of the web 212 from the starting edge of the web 212. For example, if the overall length of the web 212 is "37000 mm", the notched portion 212*a* will be formed at a predetermined position where the web length from the starting edge of the web 212 is "35150 mm", in other words, at a position where the residual quantity of the web is "1850 mm". For example, if a winding quantity of the web 212 wound around the web winding roller 214 is "0.1 mm/sheet", detection is performed when the residual quantity of the web is "18500 sheets".

Web Diameter Detection Unit

Figure 5A:
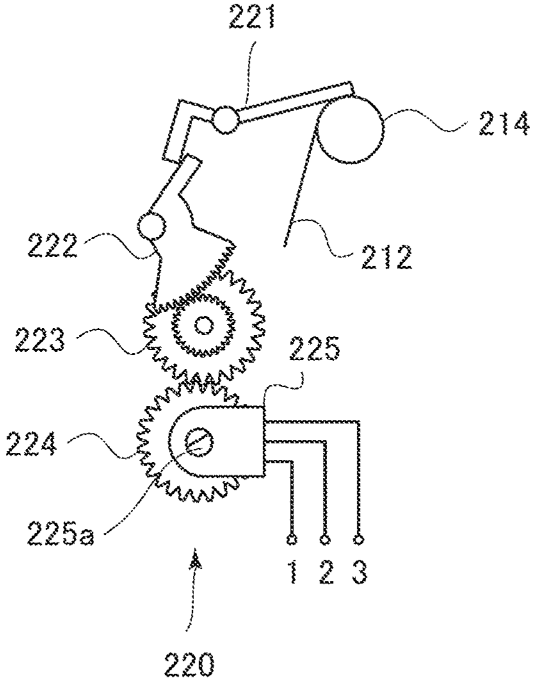
FIG. 5A is a side view illustrating a web diameter detection unit in a state where there is small web residual quantity.
Figure 5B:
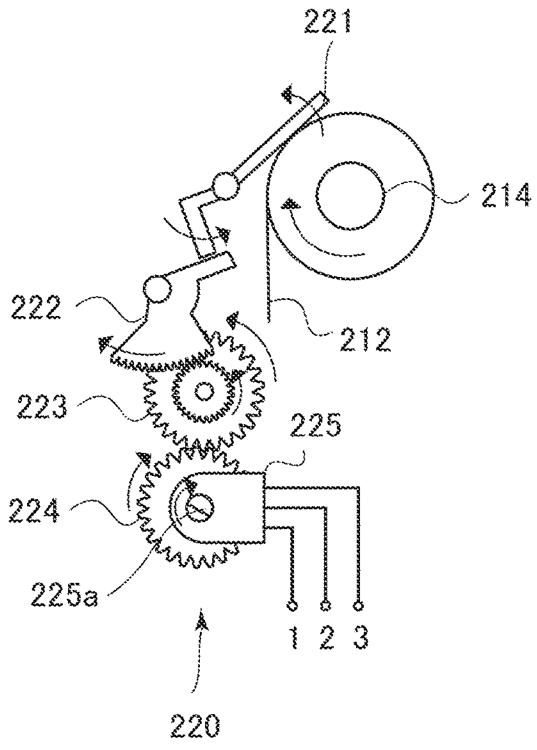
FIG. 5B is a side view illustrating the web diameter detection unit in a state where there is large web residual quantity.

In the present embodiment, a web diameter detection unit 220 is disposed to detect an outer diameter of the web 212 wound around the web winding roller 214. The web diameter detection unit 220 is an example of the detection unit. The web diameter detection unit 220 will be described with reference to FIGS. 5A to 6. FIG. 5A illustrates a state in which the web 212 is not yet wound around the web winding roller 214. FIG. 5B illustrates a state in which the web 212 is wound around the web winding roller 214.

As illustrated in FIGS. 5A and 5B, the web diameter detection unit 220 serving as an outer diameter signal output portion includes an outer diameter detection lever 221, a link gear 222, a two-step gear 223, a rotary volume gear 224, and a rotary volume resistor 225. The rotary volume resistor 225 is an example of a variable resistor.

The outer diameter detection lever 221 serving as a swinging unit has a first end side that comes into contact with a surface of the web 212 wound around the web winding roller 214 with a pressure low enough so as not to affect the winding of the web 212, and a second end side that comes into contact with the link gear 222. The outer diameter detection lever 221 is disposed swingably according to the size of the outer diameter of the web 212 wound around the web winding roller 214. Therefore, if the first end side is displaced according to the size of the outer diameter of the web 212, the second end side thereof presses down the link gear 222. Thereby, the link gear 222 swings in linkage with the outer diameter detection lever 221.

The link gear 222 is meshed with the two-step gear 223, and in a state where the link gear 222 swings in linkage with a pivoting amount of the outer diameter detection lever 221, the two-step gear 223 rotates. The two-step gear 223 is also meshed with the rotary volume gear 224, and in a state where the two-step gear 223 rotates, the rotary volume gear 224 rotates. A gear axis of the rotary volume gear 224 is a D-cut shaft, and it is fit to a rotating portion 225*a* of the rotary volume resistor 225. Therefore, the rotating portion 225*a* of the rotary volume resistor 225 rotates in accordance with the rotation of the rotary volume gear 224.

Thus, according to the present embodiment, in a state where the web 212 is wound and the outer diameter of the web 212 wound around the web winding roller 214 is gradually increased, the outer diameter detection lever 221 is pivoted in a counterclockwise direction. In a state where the outer diameter detection lever 221 pivots, the rotating portion 225*a* of the rotary volume resistor 225 rotates through the link gear 222, the two-step gear 223, and the rotary volume gear 224. The rotary volume resistor 225 includes terminals 1 to 3, and a resistance value R12 between terminals 1 and 2 and a resistance value R23 between terminals 2 and 3 vary according to a rotation angle of the rotating portion 225*a*.

Figure 6:
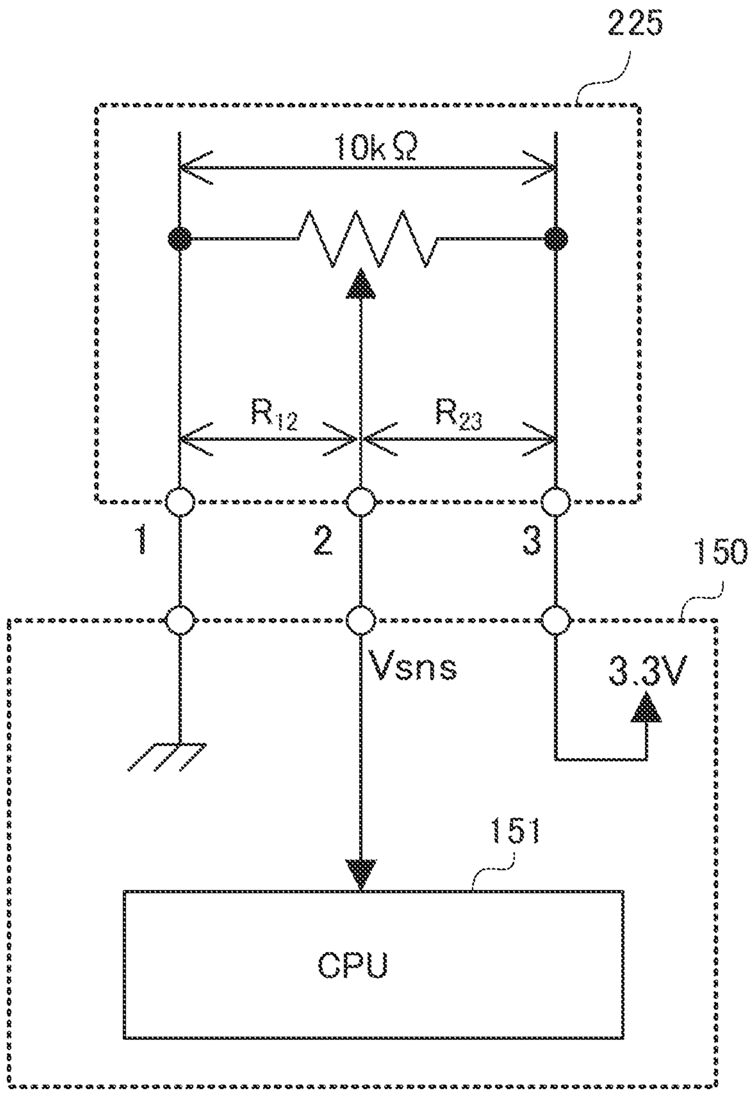
FIG. 6 is a circuit diagram illustrating a rotary volume resistor.

As illustrated in FIG. 6, the terminals 1 to 3 of the rotary volume resistor 225 are connected to the control unit 150. More specifically, terminal 1 is connected to GND, terminal 2 is connected to an input terminal connected to a CPU 151 as detection voltage Vsns, and terminal 3 is connected to a "3.3 V" power supply. In the present embodiment, a total resistance value R13 of the rotary volume resistor 225, that is, the resistance value between terminals 1 to 3, is set to "10 kΩ", and the resistance value R12 between terminals 1 and 2 and the resistance value R23 between terminals 2 and 3 are varied according to the rotation angle of the rotating portion 225*a* of the rotary volume resistor 225. That is, the resistance value is expressed as "R13=R12+R23=10 kΩ". Further, the detection voltage Vsns entered to the CPU 151 is the voltage obtained based on the ratio of resistance value R12 and resistance value R23 of "3.3 V" applied from the power supply, and it can be calculated by the following Expression 1.

$$Vsns=3.3\ V\times(R12)/(R12+R23) \qquad \text{Expression 1}$$

As described, the web diameter detection unit 220 obtains the outer diameter of the web 212 wound around the web winding roller 214 as a mechanical oscillation quantity, and converts the mechanical oscillation quantity by the rotary volume resistor 225 serving as a conversion unit as a signal value into the detection voltage Vsns and outputs the same.

Control Unit

Figure 2:
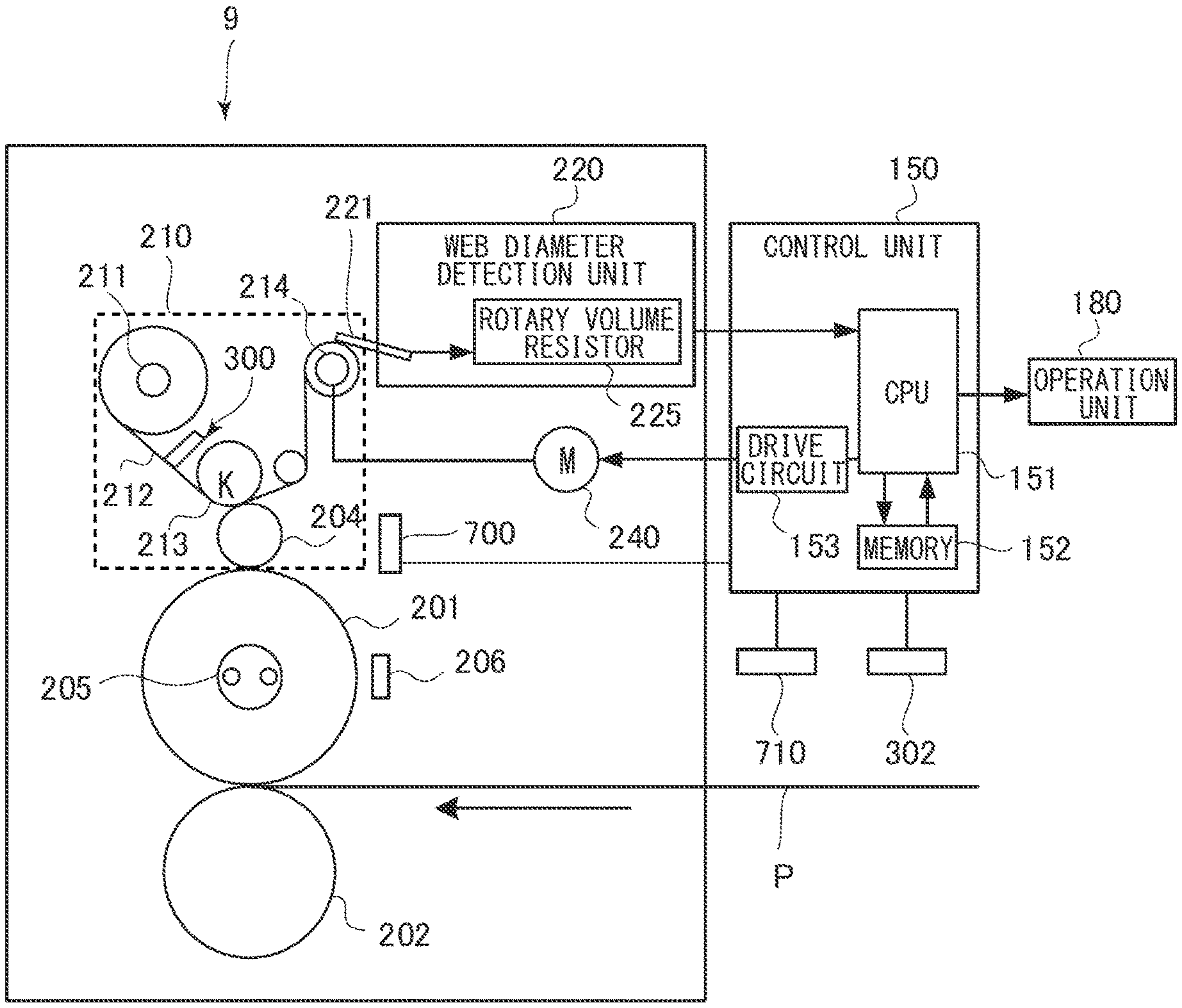
FIG. 2 is a schematic drawing illustrating a fixing unit and a control block.

The image forming apparatus 100 includes the control unit 150, and as illustrated in FIG. 2, an operation unit 180, the web drive motor 240, and the web diameter detection unit 220 are connected to the control unit 150. In addition to the units illustrated in FIG. 2, various devices such as a motor for driving the photosensitive drum and the driving roller or a power supply for applying charging voltage and primary transfer voltage are connected to the control unit 150, but since they are not related to the main object of the present invention, they are not shown in the drawings.

The control unit 150 controls various operations of the image forming apparatus 100, such as the image forming operation, and includes a Central Processing Unit (CPU) 151 and a memory 152, such as a Read Only Memory (ROM) and a Random Access Memory (RAM). The memory 152 stores various programs and various data for controlling the image forming apparatus 100. The CPU 151 can execute various programs such as an image forming processing (not shown) stored in the memory 152 or a "web residual quantity detection processing" (refer to FIG. 8) described later. Further, the memory 152 can temporarily store results of arithmetic processing accompanying the execution of various programs.

The operation unit 180 disposed on the apparatus body 100*a* is connected to the control unit 150. The operation unit 180 can be used to input various information to the control unit 150 and display various information obtained from the control unit 150. The operation unit 180 is a touch panel, for example, and the control unit 150 can receive input of various information, such as the starting of an image forming job through the operation of software keys displayed on the operation unit 180 by the maintenance personnel. Further, the control unit 150 displays various information such as a replacement message prompting replacement of the web 212 or operation errors and various executable programs on the operation unit 180 for the maintenance personnel. That is, the operation unit 180 is an example of a display unit, and is configured to output a warning to replace the web 212 when the flag 301 has reached the notched portion 212*a*. Further, when presenting a message to replace the web 212 to the maintenance personnel, the message can be presented through flashing of lights using an LED or generation of warning noise through a speaker, instead of displaying a replacing message on the operation unit 180.

The image forming job refers to a series of operations from the start of an image forming operation to the completion of the image forming operation based on a print signal for forming an image on the recording material P. That is, the image forming job refers to a series of operations from the start of a preliminary action, so-called pre-rotation, that is required to perform image formation, and through an image forming step until the completion of the preliminary action, so-called post-rotation, that is required to end the image formation. Specifically, it refers to a period from the pre-rotation, i.e., preparation operation prior to forming an image, after a print signal has been received, or after an image forming job has been received, until the post-rotation, i.e., operation after forming an image, including an image forming period and interval between sheets.

Further, the flag sensor 302 described above is connected to the control unit 150, and based on the detection of displacement of the flag 301 by the flag sensor 302 (refer to FIG. 3B), the control unit 150 outputs that the web 212 has reached the predetermined residual quantity as information related to the residual quantity of the web 212. Further according to the present embodiment, a web replacement sensor 700 capable of detecting replacement of the web 212 in the cleaning unit 210 is provided and connected to the control unit 150. The control unit 150 can determine whether the web 212 has been replaced based on the detection signal of the web replacement sensor 700. Further, the opening/closing sensor 710 described above is connected to the control unit 150, and when opening/closing of the door 500 has been detected by the opening/closing sensor 710, it can be determined that the maintenance operation of the fixing unit 9 or the replacement operation of the web 212 has been performed.

The control unit 150 controls the web drive motor 240 serving as a driving unit for driving the web winding roller 214 to rotate, as described above. The control unit 150 controls the web drive motor 240 so that the winding quantity of the web 212 is set to a predetermined value, such as 0.1 mm/sheet, each time toner images have been formed to a predetermined number of sheets of recording material P. If much toner is attached to the fixing roller 201, the web drive motor 240 is preferably controlled so that the web 212 is supplied from the web feed roller 211 with a greater winding quantity, such as 0.5 mm/sheet, for example. Alternatively, the web drive motor 240 can be controlled such that the winding quantity of the web 212 is set to a predetermined value, such as 0.1 mm/10 sheets, for example, every time toner images are formed to multiple sheets of recording material P.

Further, as described above, according to the present embodiment, the outer diameter of the web 212 wound around the web winding roller 214 can be detected by the web diameter detection unit 220. The web diameter detection unit 220 uses the outer diameter detection lever 221 to acquire the outer diameter of the web of the web winding roller 214 mechanically as an oscillation quantity, converts the oscillation quantity by the rotary volume resistor 225 into a voltage value, i.e., detection voltage Vsns, and outputs the same to the control unit 150.

Table 1 shows a table data illustrating one example of respective values of an outer diameter (mm) of the web 212, a detection voltage Vsns (V) of the rotary volume resistor 225, and a web residual quantity prediction value (mm). The table data is stored in advance in the memory 152. If the detection voltage Vsns is not indicated in Table 1, the outer diameter and the web residual quantity prediction value of the web 212 will be a value obtained through linear interpolation of specified values of two points close to the actual detection voltage Vsns in Table 1. Regardless of the size of the outer diameter of the web, the control unit 150 can control the web drive motor 240 and adjust the amount of rotation of the web winding roller 214 based on the web residual quantity prediction value such that the winding quantity of the web 212 per one operation becomes a predetermined value.

apparatus 100 is turned off, the "near-end counter" is not counted. In other words, the update of the residual quantity of the web is performed while the power of the image forming apparatus 100 is turned on, and it is not performed while the power is turned off, such that when rewinding of the web 212 was performed while the power is turned off, it was difficult to estimate the residual quantity of the web.

TABLE 1

| WEB OUTER DIAMETER φ (mm) | 12 | 20 | 30 | 40 | 50 |
|---|---|---|---|---|---|
| DETECTION VOLTAGE Vsns(V) | 0.420 | 0.875 | 1.443 | 2.012 | 2.580 |
| WEB RESIDUAL QUANTITY PREDICTION VALUE (mm) | 37000 | 33000 | 25000 | 14000 | 0 |

In the image forming apparatus 100, the maintenance personnel may turn off the power and perform maintenance of the cleaning unit 210. During the maintenance operation, the maintenance personnel may rewind the web 212, and accordingly, the residual quantity of the web may be reduced. According to a comparative example that does not include the web diameter detection unit 220 described above and that detects that the residual quantity of the web has reached a predetermined residual quantity based on the displacement of the flag 301 described above, it is difficult to detect the correct residual quantity of the web if the residual quantity of the web is reduced after displacement of the flag 301. Now, a method for detecting a residual quantity of the web according to the comparative example will be described with reference to FIG. 7A, and a method for detecting the residual quantity of the web according to the present embodiment will be described with reference to FIG. 7B.

According to the comparative example, as illustrated in FIG. 7A, if there is enough residual quantity of the web 212, in other words, if the flag 301 has not passed through the notched portion 212*a* and is not in a displaced state, the flag sensor 302 is in the light transmitting state (OFF). In a state where the flag sensor 302 is turned from the light transmitting state (OFF) to the light shielding state (ON), the control unit 150 determines that the residual quantity of the web has reached a predetermined residual quantity, or "near-end state".

The control unit 150 can estimate the residual quantity of the web from the "near-end state" using a "near-end counter" that counts the number of times of winding of the web 212, even after the residual quantity of the web has become smaller than the predetermined residual quantity. The "near-end counter" is started by the control unit 150 when the power of the image forming apparatus 100 is on. When the "near-end counter" exceeds a predetermined end threshold, the control unit 150 determines an "end state" in which the replacement of the web 212 is required. That is, the "near-end state" indicates a state in which the web 212 has a predetermined residual quantity or less to realize image formation to a predetermined number of sheets of recording material P. The "end state" indicates a state in which the residual quantity of the web is smaller than the "near-end state" and that there is a risk that the web 212 is used up if a new image forming job is performed. According to the comparative example, the control unit 150 distinguishes the "near-end state" from the "end state" using the "near-end counter", and if the "near-end counter" becomes greater than the end threshold "50000", for example, it is determined that the state has proceeded from the "near-end state" to the "end state".

However, according to the comparative example, even if the web 212 is rewound during the maintenance operation of the cleaning unit 210, since the power of the image forming According to the above configuration, an error may occur in the residual quantities of the web estimated before and after the turning on of power, such that after detecting the "near-end state", the maintenance personnel is notified to replace the web 212, and the execution of a new image forming job is not permitted until the web 212 has been replaced. That is, according to the comparative example, in a state where the flag 301 is displaced and the "near-end state" is detected, even if there is an attempt to execute an image forming job in succession, a new image forming job could not be executed after the completion of the image forming job that is currently executed unless the web 212 had been replaced by the maintenance personnel. As described, according to the comparative example, after the flag 301 had been displaced, regardless of whether the web 212 has residual quantity, the maintenance personnel had to replace the web 212, such that the web 212 was wasted.

In contrast, according to the present embodiment, as illustrated in FIG. 7B, after detecting the residual quantity of the web using the sensor unit 300, the residual quantity of the web 212 after the "near-end state" can be estimated using the outer diameter of the web 212 detected by the web diameter detection unit 220 and the "near-end counter". Although it is described in detail later, if the power is turned off after the "near-end state" and then turned on again, the control unit 150 determines whether to permit execution of the image forming job based on the change in outer diameter of the web 212.

Further, there is a limit in the accuracy of the detection voltage Vsns of the web diameter detection unit 220, more specifically, the rotary volume resistor 225, since it may include errors caused by meshing of gears, for example. Therefore, as illustrated in FIG. 7B, the detection voltage Vsns of the web diameter detection unit 220 is not used as it is, and instead, it is used for determining the change of outer diameter by dividing the level of the outer diameter of the web 212 into predetermined levels, such as three levels of small, medium, and large. For example, in the outer diameter table data illustrated in Table 1, the outer diameter of the web of "20 mm" or less corresponds to "small", the outer diameter of the web of "great than 20 mm and 50 mm or less" corresponds to "medium", and the outer diameter of the web greater than "50 mm" corresponds to "large". A residual quantity determination data illustrated in FIG. 7B is stored in advance in the memory 152.

One method for enhancing a detection accuracy of the outer diameter of the web by the web diameter detection unit 220 is a method for calibrating the detection voltage Vsns of the rotary volume resistor 225 using a reference point. In the present embodiment, for example, the detection voltage of the rotary volume resistor 225 in the "near-end state" in which the sensor unit 300, more specifically, the flag sensor 302, is turned "ON" is stored as the reference point in the memory 152, and it is used for calibrating the detection voltage Vsns in the "near-end state" and thereafter. Thereby, the outer diameter of the web 212 from the "near-end state" to the "end state" can be detected accurately. Further, in a state where the sensor unit 300 is "OFF", that is, in the "near-end state", the detection voltage of the rotary volume resistor 225 is stored in the memory 152 as a different reference point, and it can be used for calibrating the detection voltage Vsns from after the replacement of the web 212 until the "near-end state".

Web Residual Quantity Determination Processing

Figure 8:
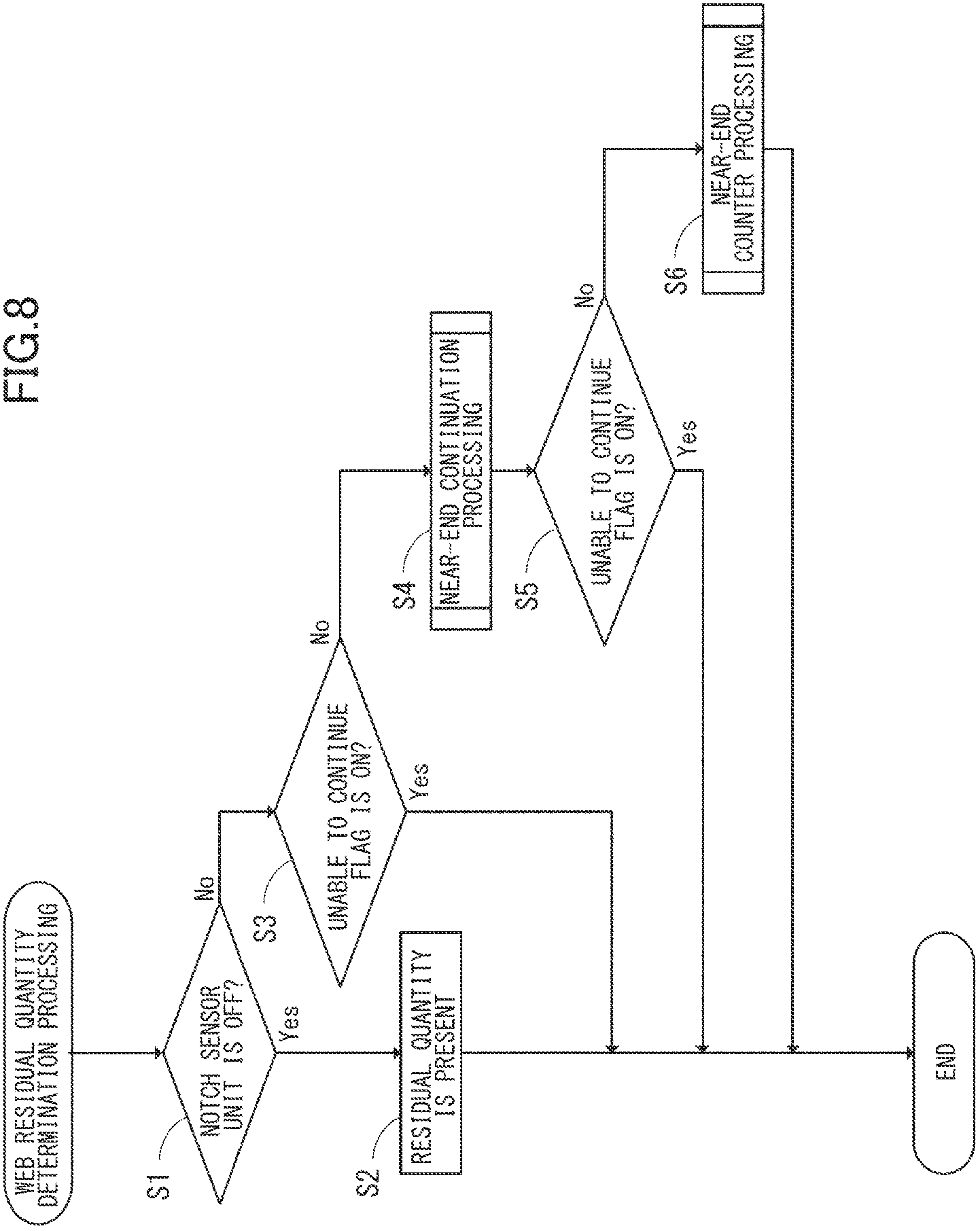
FIG. 8 is a flowchart illustrating a web residual quantity detection processing.
Figure 9:
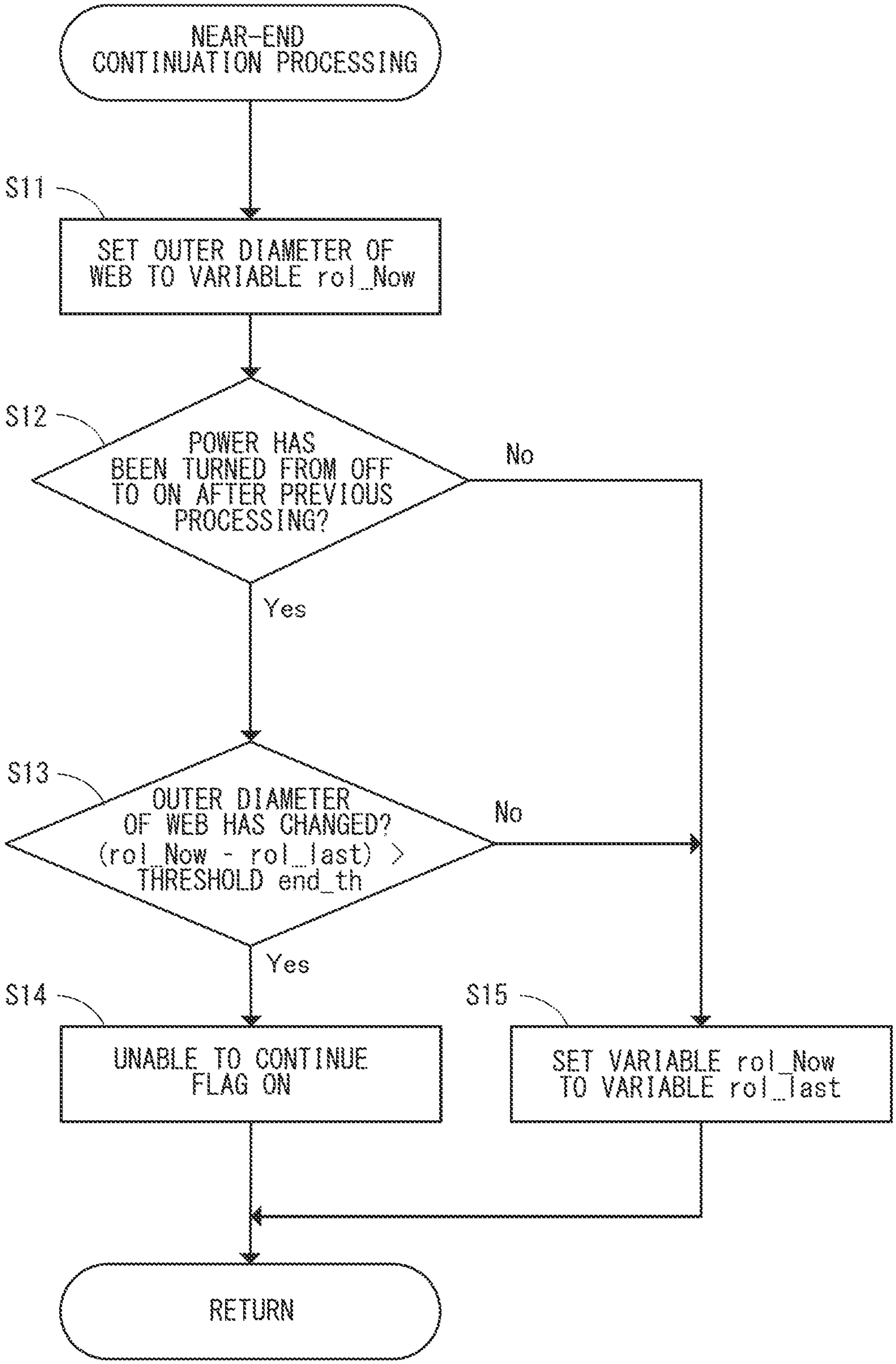
FIG. 9 is a flowchart illustrating a near-end continuation processing.
Figure 10:
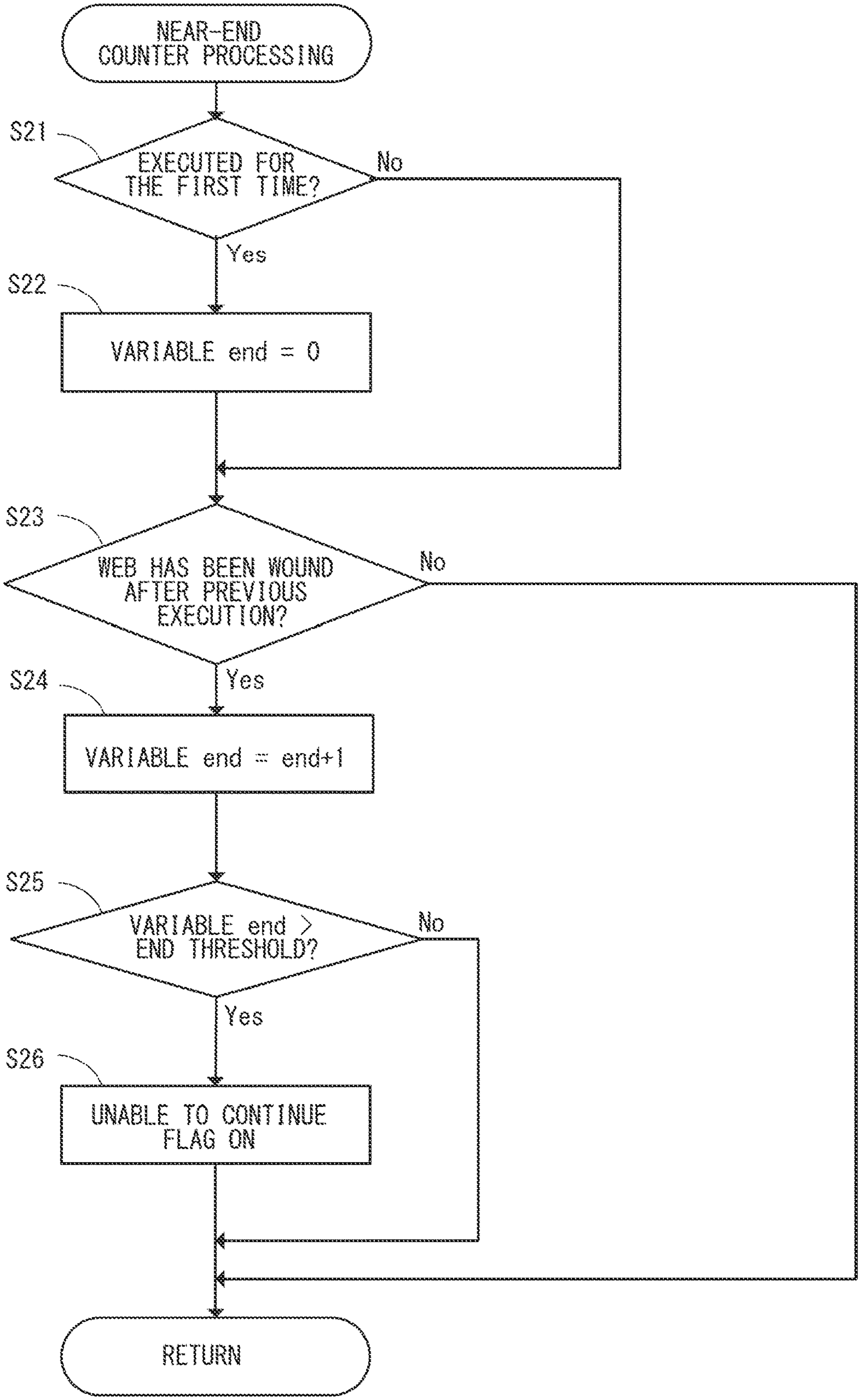
FIG. 10 is a flowchart illustrating a near-end counter processing.

Next, a "web residual quantity determination processing" according to the present embodiment will be described based on FIGS. 8 to 10 with reference to FIGS. 2, 3, and 7. According to the present embodiment, for example, a maintenance personnel turns off the power of the image forming apparatus 100 before performing a maintenance operation of the fixing unit 9 including rewinding of the web 212, and after completing the maintenance operation, turns on the power of the image forming apparatus 100. The "web residual quantity determination processing" described here is started by the control unit 150 and repeatedly executed in response to the turning off and turning on of the power of the image forming apparatus 100.

The control unit 150 determines whether the sensor unit 300 is "OFF" in a state where the power of the apparatus body 100*a* is turned on (S1). If the sensor unit 300 is "OFF", that is, if the web 212 has not reached the predetermined residual quantity (S1: Yes), the control unit 150 detects that there is "residual quantity" of the web 212 (S2), and ends the "web residual quantity determination processing". If there is residual quantity of the web 212, when executing an image forming job, the control unit 150 drives the web drive motor 240 and performs winding of a predetermined amount of the web 212 by the web winding roller 214 each time a toner image is formed to a predetermined number of sheets of recording material P.

If the sensor unit 300 is "ON", that is, if the web 212 has reached a predetermined residual quantity in a state where the flag 301 had been displaced at the notched portion 212*a* (S1: No), the control unit 150 determines whether "unable to continue flag" has already been set ON (S3). "Unable to continue flag" is set by a "near-end continuation processing" (refer to FIG. 8) described later. If the "unable to continue flag" is already set ON (S3: Yes), the control unit 150 ends the "web residual quantity determination processing".

If the "unable to continue flag" is not set ON (S3: No), the control unit 150 executes the "near-end continuation processing" described later (S4). Thereafter, the control unit 150 determines whether the "unable to continue flag" has been set ON accompanying the execution of the "near-end continuation processing" (S5). If the "unable to continue flag" has been set ON (S5: Yes), the control unit 150 ends the "web residual quantity determination processing". If the "unable to continue flag" has not been set ON (S5: No), the control unit 150 executes the "near-end counter processing" for determining whether the state has been transited from the "near-end state" to the "end state" based on the near-end counter (S6) before ending the "web residual quantity determination processing". The "near-end counter processing" will be described in detail later (refer to FIG. 10).

Near-End Continuation Processing

The "near-end continuation processing" described above (S4 of FIG. 8) will be described based on FIG. 9 with reference to FIG. 2. At first, the control unit 150 sets an outer diameter of the web detected by the web diameter detection unit 220 as a variable rol_Now in the memory 152 (S11). Then the control unit 150 determines whether the power has been turned off after the pervious execution of the "web residual quantity determination processing" (S12).

If the power has not been turned off and on after the previous processing (S12: No), the control unit 150 determines that there is sufficient residual quantity of the web, sets the variable rol_Now to variable rol_last and stores the same in the memory 152 (S15), and then returns to the "web residual quantity determination processing" (refer to FIG. 8). Meanwhile, if the power supply is turned off and on after the previous processing (S12: Yes), the control unit 150 compares an absolute value of a difference between the variable rol_Now and the variable rol_last with a threshold value end_th, and determines whether the outer diameter of the web has changed (S13). If the absolute value of the difference between the variable rol_Now and the variable rol_last is greater than the threshold value end_th, it is determined that the outer diameter of the web has changed before and after the turning on of power. The threshold value end_th is set to a value capable of determining the change of the outer diameter of the web by taking into consideration the error of the web diameter detection unit 220 that has been obtained experimentally.

In a state where the outer diameter of the web has not changed (S13: No), the control unit 150 executes the processing of step S15 described above and returns to the "web residual quantity determination processing" (refer to FIG. 8). Meanwhile, if the outer diameter of the web has changed (S13: Yes), the control unit 150 sets the "unable to continue flag" ON (S14). That is, in a state where the power of the image forming apparatus 100 is turned on, if the absolute value of a difference between a signal value (variable rol_last) of the web diameter detection unit 220 that had been output during power off and a signal value (variable rol_Now) of the web diameter detection unit 220 that had been output during power on is greater than the threshold value end_th, the "unable to continue flag" is set ON and the execution of the image forming job is not permitted. That is, when the image forming apparatus 100 is turned from a first power-ON state to a second power-ON state through a power-OFF state after the flag 301 has reached the notched portion 212*a*, if a difference between the outer diameter of the web 212 detected by the web diameter detection unit 220 at an end of the first power-ON state and the outer diameter of the web 212 detected by the web diameter detection unit 220 at a start of the second power-ON state is equal to or greater than a predetermined value, the control unit 150 is configured to control the image forming unit Pa, Pb, Pc, and Pd not to form a toner image on a recording material. Meanwhile, if the absolute value of the difference between the signal value (variable rol_last) and the signal value (variable rol_Now) is equal to or smaller than a threshold value end_th, that is, equal to or smaller than a threshold value or less, the "unable to continue flag" is not set ON and the execution of the image forming job is permitted. That is, when the image forming apparatus 100 is turned from the first power-ON state to the second power-ON state through the power-OFF state after the flag 301 has reached the notched portion 212*a*, if the difference between the outer diameter of the web 212 detected by the web diameter detection unit 220 at the end of the first power-ON state and the outer diameter of the web 212 detected by the web diameter detection unit 220 at the start of the second power-ON state is smaller than the predetermined value, the control unit 150 is configured to permit the image forming unit Pa, Pb, Pc, and Pd to form a toner image on a recording material.

That is, according to the present embodiment, in a state where the "unable to continue flag" is set ON, the control unit 150 will not permit execution of the image forming job even if the start of the image forming job is entered from the operation unit 180. This is because the residual quantity of the web 212 may have been reduced from the predetermined residual quantity during power off, and if the image forming job is performed thereafter, the use of the web 212 may cause the web 212 to be used up, which may lead to breakage or cleaning failure of the web 212.

Near-End Counter Processing

The "near-end counter processing" (S6 of FIG. 8) described above will be described based on FIG. 10 with reference to FIG. 2. At first, the control unit 150 determines whether the "near-end counter processing" is performed for the first time after entering the "near-end state" (S21). In order to determine whether the processing is performed for the first time, the control unit 150 can store in the memory 152 when the "near-end state" is determined based on the detection result of the sensor unit 300 that the next execution will be the first time, for example.

If the "near-end counter processing" is not executed for the first time (S21: No), the control unit 150 jumps to the processing of step S23. If the "near-end counter processing" is performed for the first time (S21: Yes), the control unit 150 clears the "near-end counter" (S22) and advances to the processing of step S23. In this step, the "near-end counter" storing the variable end is cleared to "0".

In step S23, the control unit 150 determines whether a winding operation of winding a predetermined amount of the web 212 that is performed each time a toner image is formed to a predetermined number of sheets of recording material P has been performed after executing the previous "near-end counter processing". If the winding operation of the web 212 has not been performed (S23: No), the control unit 150 returns to the "web residual quantity determination processing" (refer to FIG. 8). If the winding operation of the web 212 has been performed (S23: Yes), the control unit 150 counts up the "near-end counter" to estimate the residual quantity of the web (variable end=variable end+1, S24).

The "near-end counter" indicates the number of times of winding of the web 212 after the web 212 has reached the predetermined residual quantity, which is used as an indicator that indicates an integrated value of predetermined amounts of winding of the web 212 that has been performed after the web 212 has reached the predetermined residual quantity. That is, by multiplying the "near-end counter" by the "predetermined amount of winding of the web 212", the winding quantity of the web 212 after the web 212 has reached the predetermined residual quantity is obtained. In the present embodiment, "1" is added to the variable end each time winding of the web 212 is performed, but the present technique is not limited thereto, and for example, if the size of the recording material P or the image size is equal to or greater than a predetermined size, "2" can be added, or an arbitrary value corresponding to the ratio of size can be added.

The control unit 150 determines whether the "near-end counter" is greater than an end threshold, or predetermined number of times (S25). If the "near-end counter" is equal to or smaller than the end threshold (S25: No), the control unit 150 returns to the "web residual quantity determination processing". Meanwhile, if the "near-end counter" is greater than the end threshold (S25: Yes), the control unit 150 is set to "unable to continue flag" ON (S26), and the control unit 150 returns to the "web residual quantity determination processing". This is because if the state is transferred from the "near-end state" to the "end state" according to the use of the web 212 and a new image forming job is performed, there is a risk that the web 212 is used up.

As described, according to the present embodiment, whether to permit execution of the image forming job is determined based on the change in outer diameter of the web 212 during power off and power on in a state where the power of the image forming apparatus 100 has been turned off and then turned on after the web 212 has reached the predetermined residual quantity. If the change of outer diameter of the web 212 is equal to or smaller than a predetermined threshold value during power off and power on, it is assumed that the rewinding of the web 212 has not been performed during power off and that the residual quantity of the web has not been reduced during power off and power on, so that the execution of the image forming job is permitted. Meanwhile, if the change of outer diameter of the web 212 during power off and power on is greater than a predetermined threshold value, there is a possibility that rewinding of the web 212 has been performed during power off, such that it is assumed that the residual quantity of the web has been reduced during power off and power on, so that the execution of the image forming job is not permitted according to which the operation efficiency of the image forming apparatus 100 can be improved.

Thereby, even if the power of the image forming apparatus 100 has been turned off and on after the web 212 had reached the predetermined residual quantity, the image forming job can be executed as long as the web 212 has residual quantity. That is, even after the web 212 that had reached the predetermined residual quantity has been rewound, if the residual quantity of the web has not been reduced during power off and power on, the image forming job can be executed without having the maintenance personnel replace the web 212, such that the web will not be wasted. Further, since the image forming job can be executed without waiting for the web to be replaced, the operation efficiency of the image forming apparatus 100 can be improved.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-094790, filed Jun. 13, 2022 which is hereby incorporated by reference herein in its entirety.

What is claimed is:

1. An image forming apparatus comprising:

an image forming unit configured to form a toner image on a recording material;

a first rotary member;

a second rotary member configured to form a nip portion together with the first rotary member and fix a toner image to a recording material;

a web configured to collect toner from a surface of the first rotary member and including a notch formed at a part of a first end portion of the web in a width direction of the web;

a feed roller around which the web is wound and configured to feed the web to collect toner from the surface of the first rotary member;

a winding roller configured to wind the web used to collect toner from the surface of the first rotary member;

a first contact member configured to be in contact with the first end portion of the web;

a detection unit configured to detect an outer diameter of the web wound around the winding roller or the feed roller; and a control unit configured to control the image forming unit, wherein, in a state where the image forming apparatus is turned from a first power-ON state to a second power-ON state through a power-OFF state after the first contact member has reached the notch, if a difference between the outer diameter of the web detected by the detection unit at an end of the first power-ON state and the outer diameter of the web detected by the detection unit at a start of the second power-ON state is equal to or greater than a predetermined value, the control unit controls the image forming unit not to form a toner image on a recording material, and wherein, in the state where the image forming apparatus is turned from the first power-ON state to the second power-ON state through the power-OFF state after the first contact member has reached the notch, if the difference between the outer diameter of the web detected by the detection unit at the end of the first power-ON state and the outer diameter of the web detected by the detection unit at the start of the second power-ON state is smaller than the predetermined value, the control unit permits the image forming unit to form a toner image on a recording material.

2. The image forming apparatus according to claim 1, further comprising a collecting roller configured to be in contact with the web and the first rotary member and collect toner from the surface of the first rotary member, wherein the first rotary member comes into contact with the collecting roller without being in contact with the web, by which toner from the surface of the first rotary member is collected by the web through the collecting roller.

3. The image forming apparatus according to claim 1, wherein the detection unit includes a second contact member configured to be in contact with the web wound around the winding roller, and wherein the detection unit is configured to detect the outer diameter by detecting a position of the second contact member.

4. The image forming apparatus according to claim 3, wherein the detection unit includes a variable resistor, and wherein the variable resistor is configured such that a resistance of the variable resistor varies according to the position of the second contact member.

5. The image forming apparatus according to claim 1, wherein the detection unit is configured to detect the outer diameter of the web wound around the winding roller.

6. The image forming apparatus according to claim 1, further comprising a display unit configured to output a warning to replace the web in a state where the first contact member has reached the notch.

7. The image forming apparatus according to claim 1, wherein, in a state where the web is wound, the detection unit is configured to detect the outer diameter of the web wound around the winding roller or the feed roller.

8. An image forming apparatus comprising:

an image forming unit configured to form a toner image on a recording material;

a first rotary member;

a second rotary member configured to form a nip portion together with the first rotary member and fix a toner image to a recording material;

a web configured to collect toner from a surface of the first rotary member;

a feed roller around which the web is wound and configured to feed the web to collect toner from the surface of the first rotary member;

a winding roller configured to wind the web used to collect toner from the surface of the first rotary member;

a detection unit configured to detect an outer diameter of the web wound around the winding roller or the feed roller, the detection unit being configured to detect an amount of use of the web; and a control unit configured to output an information related to replacement of the web in a state where a predetermined amount of the web has been used, wherein, in a state where the image forming apparatus is turned from a first power-ON state to a second power-ON state through a power-OFF state after the predetermined amount of the web has been used, if a difference between an outer diameter of a web detected by the detection unit at an end of the first power-ON state and an outer diameter of a web detected by the detection unit at a start of the second power-ON state is equal to or greater than a predetermined value, the control unit is configured to control the image forming unit not to form a toner image on a recording material, and wherein, in a state where the image forming apparatus is turned from the first power-ON state to the second power-ON state through the power-OFF state after the predetermined amount of the web has been used, if the difference between then outer diameter of the web detected by the detection unit at the end of the first power-ON state and then outer diameter of the web detected by the detection unit at the start of the second power-ON state is smaller than the predetermined value, the control unit is configured to permit the image forming unit to form a toner image on a recording material.

* * * * *